United States Patent [19]
Gusev et al.

[11] 4,219,874
[45] Aug. 26, 1980

[54] DATA PROCESSING DEVICE FOR VARIABLE LENGTH MULTIBYTE DATA FIELDS

[76] Inventors: Valery F. Gusev, ulitsa Karbysheva, 13-a, kv. 35; Gennady N. Ivanov, ulitsa Dekabristov, 184-a, kv. 22, both of Kazan; Vladimir Y. Kontarev, Ploschad Junosti, 4, kv. 3, Moscow; Genrikh I. Krengel, ulitsa Ibragimova, 45, kv. 49, Kazan; Evgeny O. Polivoda, ulitsa Kuibysheva, 32, kv. 24, Kazan; Alexandr N. Skvortsov, ulitsa Volodarskogo, 8, kv. 22, Kazan; Jury I. Schetinin, 103536, korpus 503, kv. 106, Moscow; Vyacheslav Y. Kremlev, Berezovaya alleya, korpus 423, kv. 81, Moscow; Mansur Z. Shagivaleev, ulitsa Karbysheva, 17, kv. 75, Kazan; Azat U. Yarmukhametov, ulitsa Adelya Kutuya, 12, kv. 23, Kazan, all of U.S.S.R.

[21] Appl. No.: 887,531

[22] Filed: Mar. 17, 1978

[51] Int. Cl.² .................. G06F 7/38; G06F 13/00
[52] U.S. Cl. ........................................... 364/200
[58] Field of Search ... 364/200 MS File, 900 MS File

[56] References Cited

U.S. PATENT DOCUMENTS

| | | | |
|---|---|---|---|
| 2,930,028 | 3/1960 | Johnson et al. | 364/900 |
| 3,370,274 | 2/1968 | Kettley et al. | 364/200 |
| 3,430,202 | 2/1969 | Downing et al. | 364/200 |
| 3,571,803 | 3/1971 | Huttenhoff et al. | 364/900 |
| 3,906,459 | 9/1975 | Desmonds et al. | 364/900 |
| 3,969,704 | 7/1976 | Liebel, Jr. | 364/900 |
| 3,982,229 | 9/1976 | Rouse et al. | 364/200 |
| 4,023,023 | 5/1977 | Bourrez et al. | 364/200 X |
| 4,109,310 | 8/1978 | England et al. | 364/200 |

*Primary Examiner*—Melvin B. Chapnick
*Attorney, Agent, or Firm*—Lackenbach, Lilling & Siegel

[57] ABSTRACT

A data processing device for variable length formats includes a control unit and a storage unit coupled to the control unit. Two data exchange buses are each coupled to a respective data input and to a respective data output of the storage unit. Two switches are coupled to the control unit and to respective data exchange buses. An arithmetic/logic unit is coupled to the control unit, to the switches and to the storage unit. A data shaft unit is coupled to the data exchange buses and to the control unit. A data masking unit is coupled to the data exchange buses, to the control unit and to the switches. This device enables the preparation for processing of multibyte data fields arbitrarily arranged with respect to the word boundaries in main storage. The data shift unit provides automatic alignment of the bytes of the operands relative to each other. The data masking unit masks irrelevant bytes of the first and last words of each operand.

5 Claims, 11 Drawing Figures

DATA PROCESSING DEVICE FOR VARIABLE LENGTH MULTIBYTE DATA FIELDS

FIELD OF THE INVENTION

This invention relates to computing machinery and, more particularly, to devices intended for processing data represented by variable-length formats.

The invention is applicable for the designing of computer processors.

Nowadays, it is realized that versatile computers are or systematic operation manufactured so as to offer a regular, which can provide for effective production processes, and a higher speed of operation. The instruction sets of such computers include logical data processing instructions and decimal arithmetic instructions which require for their execution that operands be handled in a byte-by-byte fashion. Modern computers are designed, however, especially for handling data in the form of full words. Therefore, they must be provided with devices for processing variable length data formats which are suitable for full word processing.

DESCRIPTION OF THE PRIOR ART

There is a data processing device for variable length formats (cf. I. A. Flores, Computer Organization, Prentice-Hall Inc. Publishers, Englewood Cliffs, New Jersey, 1969, FIG. 10.5.1) comprising a control unit; a storage unit connected to the control unit; two data exchange buses each being coupled to a respective data input and a respective data output of the storage units; two switches coupled to the control unit and to respective data exchange buses; and an arithmetic/logic unit coupled to the switches, to the control unit and to the storage unit. In addition, the described data processing device comprises two byte select switching members and a result byte locate switching member all coupled to the storage unit.

These switching members are necessary since the described data processing device uses half format transfers, while operands are handled in a byte-by-byte fashion.

The byte-by-byte handling of operands tends, however, to break down data processing into a number of successively performed steps whose number is equal to the number of bytes contained in operands, with the result that the speed of operation of the device is decreased. Moreover, due to half word format transfers, the known device is held in a wait state till the delivery of data from the main storage, since the access time during which an operand is available from main storage is four times the internal cycle time of the device, which also causes a decrease in its speed of operation.

SUMMARY OF THE INVENTION

An object of the invention is to provide a data processing device for variable length formats, which offers faster operation.

Another object of the invention is to provide a data processing device for variable length formats, which is able to handle data using 4-byte words.

Still another object of the invention is to provide computer processors having a more regular or systematic structure.

In accordance with the present invention, there is provided a data processing device for variable length formats, comprising a control unit and a storage unit coupled to the control unit. Two data exchange buses are coupled to a respective data input and to a respective data output of the storage unit. Two switches are coupled to the control unit and to respective data exchange buses. An arithmetic/logic unit is coupled to the switches, to the control unit and to the storage unit. A data shift unit is coupled to the data exchange buses and to the control unit. A data masking unit is coupled to the data exchange buses, to the control unit and to the switches. Preferably, the data shift unit comprises a shift parameter forming means whose control input is coupled to the control unit and whose data inputs are coupled to respective data exchange buses; a shift control means whose control input is coupled to the control unit; a shift register whose data inputs and data outputs are coupled to respective data exchange buses. The shift parameter forming means, the shift control means and the shift register are connected in series.

Preferably, the shift parameter forming means comprises a shift code register, a decoder coupled to the shift code register, at least two shift value generating AND gates and a shift direction generating AND gate. The inputs of these AND gates are coupled to respective outputs of the decoder, and the outputs of these AND gates are used as a multichannel output of the shift parameter forming means.

It is preferable that the shift control means comprise a shift direction flip-flop whose input is coupled to the shift direction generating AND gate of the shift parameter forming means. Shift value flip-flops are provided whose number is determined by the number of shift values available. One input of each shift value flip-flop is coupled to an AND gate, and the other input of each shift value flip-flop is coupled to the output of a respective shift value generating AND gate. A priority circuit is coupled to the shift value flip-flops. A decoder has data inputs coupled to the priority circuit and to the shift direction flip-flop and a control input coupled to the control unit. The other input of each AND gate is coupled to an output of the decoder.

It is preferable that the data masking unit comprise a mask code register, a decoder coupled to the mask code register, and AND gates whose number is equal to the number of data bytes onto which the zero mask is placed. The inputs of respective AND gates are coupled to respective outputs of the decoder, and the outputs of respective AND gates are coupled to the switches.

The present invention allows operands to be fetched and handled and the result to be written using full words, with the result that the number of accesses to main storage is decreased.

Moreover, the present invention allows the current word of an operand to be prepared for handling when the next word of the operand is being fetched, a feature that also tends to increase the speed of operation of the offered device.

DESCRIPTION OF THE DRAWINGS

Other features and advantages of the invention will appear from the following description of a preferred embodiment thereof, in conjunction with the accompanying drawings in which.

DETAILED DESCRIPTION OF THE INVENTION

Figure 1:
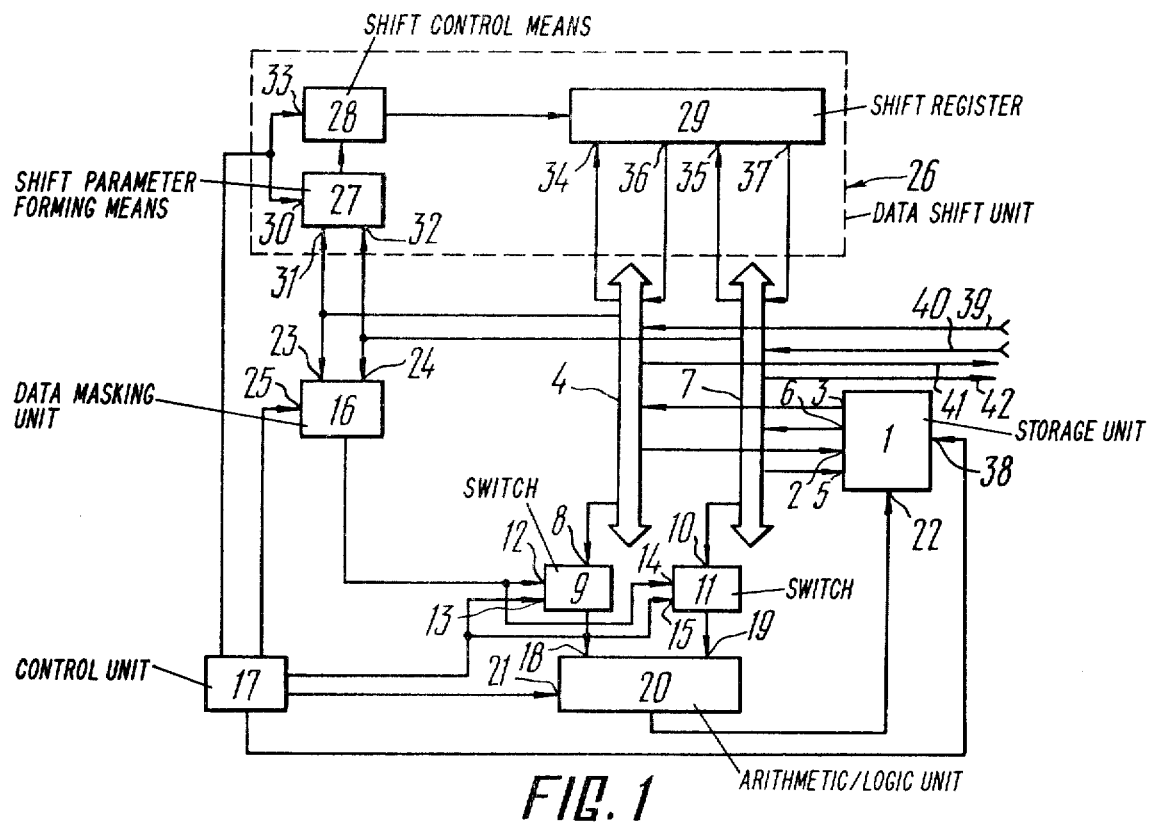
FIG. 1 is a block diagram of a data processing device for variable length formats, according to the invention.

The data processing device for variable length formats, according to the invention, comprises a storage unit 1 (FIG. 1) having its data input 2 and its data output 3 coupled to a data exchange bus 4 and having its data input 5 and its data output 6 coupled to a data exchange bus 7. An input 8 of a switch 9 is coupled to the data exchange bus 4, and an input 10 of a switch 11 is coupled to the data exchange bus 7. A multichannel output of the data masking unit 16 is coupled to multichannel inputs 12 and 14 of the switches 9 and 11. An output of the control unit 17 is connected to inputs 13 and 15 of the switches 9 and 11. Inputs 18 and 19 of an arithmetic/logic unit 20 are coupled, respectively, to the switches 9 and 11. An input 21 of the arithmetic/logic unit 20 is coupled to the control unit 17, and the output of the arithmetic/logic unit 20 is coupled to an input 22 of the storage unit 1.

Inputs 23 and 24 of the data masking unit 16 are coupled, respectively, to the data exchange buses 4 and 7, and while a control input 25 is coupled to the control unit 17. A series connected network is provided in a data shift unit 26 which includes a shift parameter forming means 27, a shift control means 28 and a shift register 29. A control input 30 and data inputs 31 and 32 of the shift parameter forming means 27 are coupled respectively to the control unit 17 and to the data exchange buses 4 and 7. A multichannel control input 33 of the shift control means 28 is coupled to the control unit 17. Data inputs 34 and 35 of the shift register 29 are coupled, respectively, to the data exchange buses 4 and 7 and data outputs 36 and 37 are respectively coupled to the data exchange buses 4 and 7. A control input 38 of the control unit 1 is coupled to the control unit 17.

There are device inputs 39 and 40 and device outputs 41 and 42 coupled to the data exchange buses 4 and 7.

The shift parameter forming means 27 (FIG. 2) comprises a shift code register 43 coupled to a decoder 44. Inputs 45 and 46 and a control input 47 of the shift code register 43 are used as inputs 31 and 32 and 30, respectively, of the shift parameter forming means 27. Inputs 48 of a shift direction generating AND gate 49 and inputs 50 and 51 of shift value generating AND gates 52 and 53 are coupled to respective outputs of the decoder 44. Outputs 54, 55 and 56 of respective AND gates 49, 52 and 53 are connected to form a multichannel output of the shift parameter forming means 27 (FIG. 1).

Figure 2:
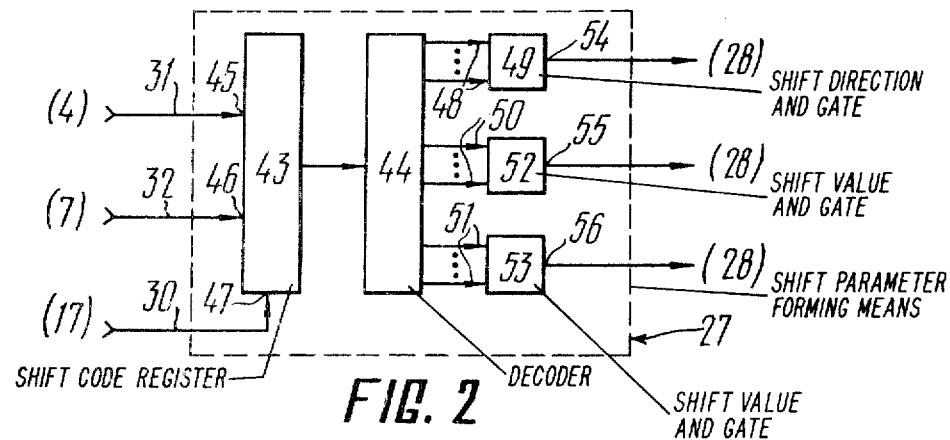
FIG. 2 is block diagram of a shift parameter forming means, according to the invention.
Figure 3:
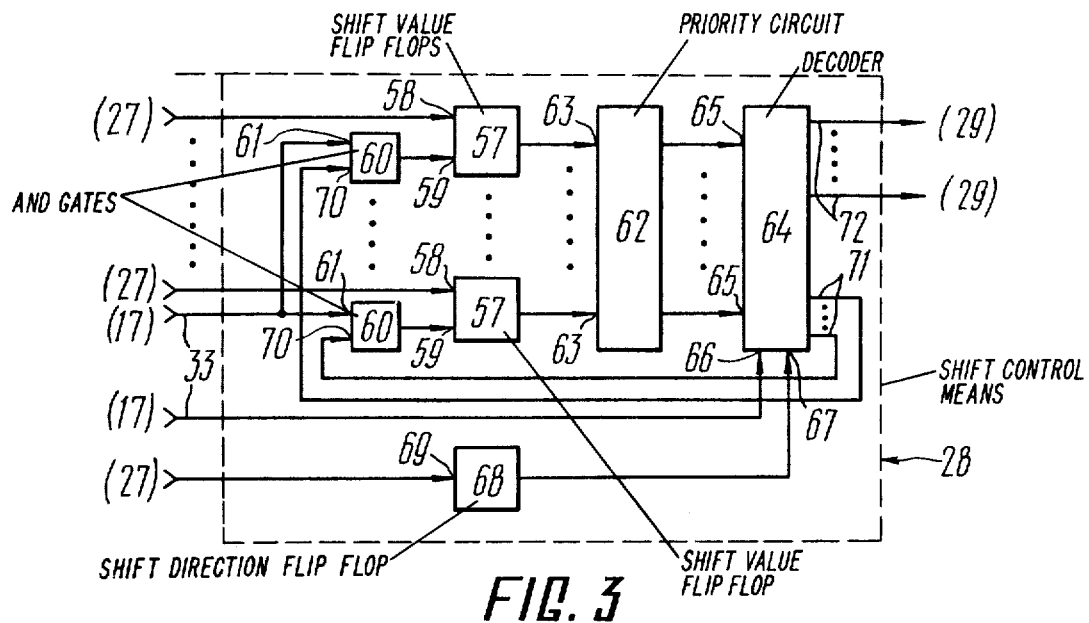
FIG. 3 is a block diagram of a shift control means, according to the invention.

The shift control means 28 comprises shift value flip-flops 57, equal in number to the number of shift values available (FIG. 3). The inputs 58 are coupled to the outputs 55 and 56 of respective AND gates 52, 53 of the shift parameter forming means 27. Outputs of AND gates 60 are coupled to inputs 59 of the shift value flip-flops 57. Inputs 61 of the AND gates 60 are coupled to the control unit 17. Inputs 63 of a priority circuit 62 are coupled to the outputs of the shift value flip-flops 57. The shift control means 28 also incorporates a decoder 64 whose inputs 65 are coupled to the priority circuit 62, whose control input 66 is coupled to the control unit 17 and whose input 67 is coupled to a shift direction flip-flop 68. The input 69 of the flip-flop 68 is coupled to the output 54 (FIG. 2) of the shift direction generating AND gate 49. Inputs 70 (FIG. 3) of the AND gates 60 are coupled to output 71 of the decoder 64 whose outputs 72 are connected to form a multichannel output of the shift control means 28.

Figure 4:
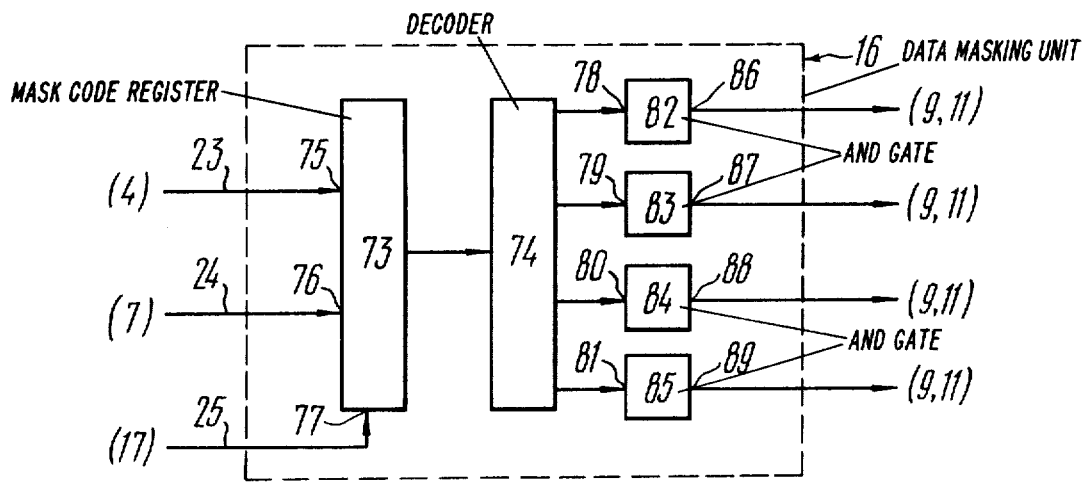
FIG. 4 is a block diagram of a data masking unit, according to the invention.

The data masking unit 16 (FIG. 4) comprises a mask code register 73 coupled to a decoder 74. Inputs 75 and 76 and a control input 77 of the mask code register 73 are connected, respectively, to the inputs 23,24 and 25 of the data masking unit 16. Inputs 78,79, 80 and 81 of AND gates 82,83,84 and 85, respectively, are coupled to the outputs of the decoder 74. Outputs 86,87,88 and 89 of the AND gates 82,83,84 and 85, respectively, are coupled to the multichannel inputs 12 and 14 (FIG. 1) of the switches 9 and 11.

Figure 5:
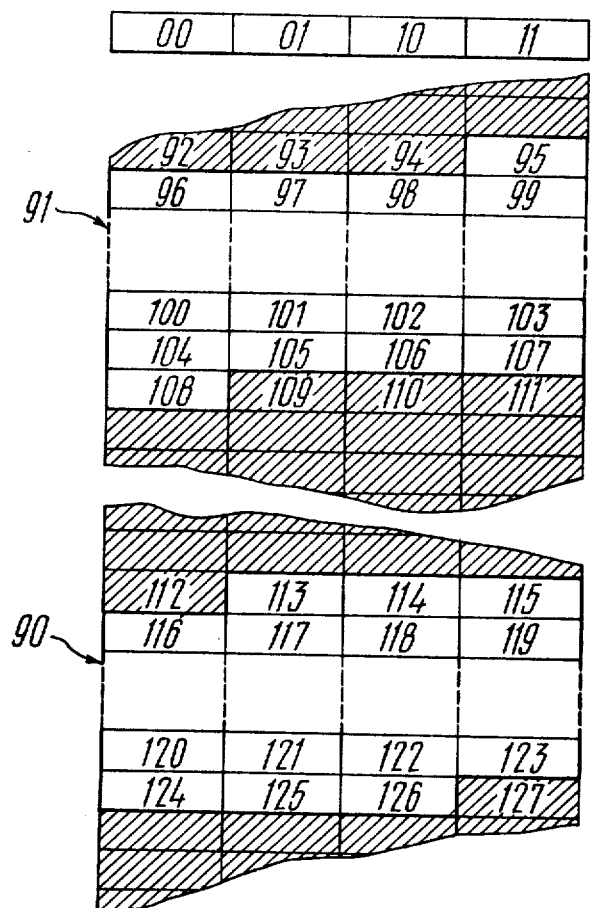
FIG. 5 shows mutual location of two operands.

FIG. 5 illustrates the relative location of a first operand 90 and a second operand 91 contained in the storage unit 1 (FIG. 1). The first word of the second operand 91 (FIG. 5) includes bytes 92,93,94 and 95; note that bytes 92,93 and 94 do not apply to the second operand 91 being handled, but byte 95 does. The second word of the second operand 91 includes bytes 96,97,98 and 99, the three last words of that operand include bytes 100,101,102,103,104,105,106,107,108,109,110 and 111. The word preceding the penultimate word of the second operand 91 includes bytes 100,101,102 and 103, the next to last word of that operand includes bytes 104,105,106 and 107 and the last word of the second operand 91 includes bytes 108,109,110 and 111. The byte 108 applies to the second operand 91 being handled, while bytes 109,110 and 111 do not apply to it. The first word of the first operand 90 includes bytes 112,113,114 and 115; byte 112, does not apply to the first operand 90 being handled, while bytes 113,114 and 115 apply to it. The second word of the first operand 90 includes bytes 116,117,118 and 119, and the next to last word and the last word include, respectively, bytes 120,121, 122 and 123 and bytes 124,125,126 and 127. In the last word, bytes 124,125 and 126 apply to the first operand 90 and byte 127 does not apply to it.

The data field of the second operand 91 contains bytes from the first byte 95 with byte code "11" to the byte 108, inclusive, with byte code "00". The data field of the first operand 90 contains bytes from the first byte 113 with byte code "01" to the byte 126, inclusive, with byte code "10".

The proposed data processing device for variable length formats operates as follows.

It is known that an addressable unit of information available from main storage of a computer is a byte composed of a group of bits and followed by a check bit. A word in main storage is composed of four bytes, while a data field is allowed to start at and terminate in any byte within the given word. Full word operands are fetched from main storage; if an operand begins or terminates within the given word, then the processor receives both the bytes incorporated in the operand being handled and the bytes which do not apply to the operand.

A data field is defined by the address of the first byte and the length of the field (the number of bytes in the field) or the addresses of the first and the last byte of the field. The concept represented by the term "byte address" is essential for any type of addressing. The byte address is composed of the word address of main storage and the byte location within the word (byte code) and is determined by:

$$A = B + C$$

where
- A is the byte address;
- B is the word address; and
- C is the byte code.

The practice is to ignore the byte code when a word is fetched from main storage because it is not possible to fetch only a portion of a word.

The byte code may assume binary values "00", "01", "10" and "11" which define, respectively, the first, second, third and fourth bytes of a word.

Prior to processing variable-length operands by full words, the operands must be arranged so that corresponding bytes occupy identical positions in the word, which means that the operands must be aligned. Most of the instructions used in modern computers specify only the addresses of the source operands, while the address of the result location is determined implicitly. As a rule, the result must be stored at the address of the first operand, namely, the result must be stored in the location of the first operand in main storage after processing is complete. Therefore, the second operand is usually aligned with respect to the first one, which enables the result to be automatically set in a position in which it should be transferred in main storage. The operands are aligned by shifting all bytes of the second operand to the right until the location of the rightmost byte of the second operand coincides with the location of the rightmost byte of the first operand, provided the operands are right-aligned; the bytes are shifted in a similar manner to the left when the operands are left-aligned. The shift value is determined by the difference between the byte codes, while the shift direction is determined by the relative location of the bytes.

To determine the shift value and direction, the addresses of the rightmost bytes 126 and 108 (FIG. 5) of the operands 90 and 91, respectively, are fetched from the storage unit 1 (FIG. 1) and placed on the data exchange buses 4 and 7. The inputs 31 and 32 of the shift parameter forming means 27 of the data shift unit 26 are coupled to those wires of the data exchange buses 4 and 7 through which the codes of the bytes 108 and 126 (FIG. 5) are delivered during transfer of the addresses of the operands 90 and 91 over the data exchange buses 4 and 7 (FIG. 1), respectively. According to a signal delivered from the control unit 17 to the control input 30, the shift parameter forming means 27 produces and passes to the shift control means 28 shift parameters to determine the shift value and direction as shown in Table 1.

Table 1

| Shift code | | Shift parameters | |
|---|---|---|---|
| Byte code on data exchange bus 7 | Byte code on data exchange bus 4 | Shift value | Shift direction |
| 00 | 00 | 0 | — |
| 00 | 01 | 8 | to the right |
| 00 | 10 | 16 | to the right |
| 00 | 11 | 24 | to the right |
| 01 | 00 | 8 | to the left |
| 01 | 01 | 0 | — |
| 01 | 10 | 8 | to the right |
| 01 | 11 | 16 | to the right |
| 10 | 00 | 16 | to the left |
| 10 | 01 | 8 | to the left |

Table 1-continued

| Shift code | | Shift parameters | |
|---|---|---|---|
| Byte code on data exchange bus 7 | Byte code on data exchange bus 4 | Shift value | Shift direction |
| 10 | 10 | 0 | — |
| 10 | 11 | 8 | to the right |
| 11 | 00 | 24 | to the left |
| 11 | 01 | 16 | to the left |
| 11 | 10 | 8 | to the left |
| 11 | 11 | 0 | — |

To align the second operand 91 (FIG. 5) with respect to the right boundary of the first operand 90, the second operand 91 is shifted 16 bit positions (two bytes) to the right. To this end, byte codes "00" and "10" of the bytes 108 and 126, respectively, are used to form shift code "0010" and corresponding shift parameters are therefore obtained according to Table 1.

During alignment, the words of the second operand 91 are fetched from main storage in succession and are loaded into the storage unit 1 through the device input 39 or 40 (FIG. 1) and through the data exchange bus 4 or 7. The current word available from main storage, along with the word obtained during the previous time step and stored in the storage unit 1, is placed on the data exchange buses 4 and 7. According to a signal to the control input 38 of the storage unit 1 from the control unit 17, data is loaded and placed on the data exchange buses 4 and 7 through the inputs 2 and 5 and outputs 3 and 6, respectively.

Figure 6A:
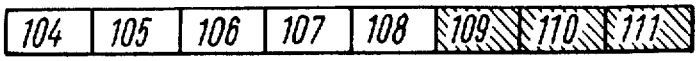
FIGS. 6a, 6b, 6c, 6d, 6e and 6f show the alignment of the second operand relative to the left boundary of the first operand, according to the invention.

The last word of the second operand 91, composed of the bytes 108,109,110 and 111 (FIG. 5), is moved from the storage unit 1 (FIG. 1) on the data exchange bus 7, while the next to last word of that operand, composed of the bytes 104,105, 106 and 107 (FIG. 5), is fetched from main storage and placed on the data exchange bus 4 (FIG. 1). FIG. 6a illustrates the location of the two words on the data exchange buses 4 and 7 from which they are delivered to the shift register 29.

Figure 6B:
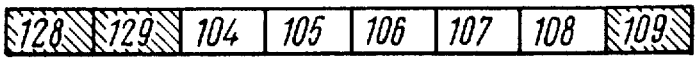
Figure 6C:
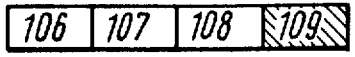

According to the shift parameters available, the shift control means 28 is activated by a signal applied to its control input 33 from the control unit 17 to produce control signals which control the operation of the shift register 29. Two words of the second operand 91, composed of the bytes 104,105,106,107,108,109,110 and 111 (FIG. 6a), are shifted 16 bit positions to the right, the bytes 110 and 111 being moved off the shift register 29 (FIG. 1). As a result, the bytes 104,105, 106,107,108,109 are left in the shift register 29, while bytes 128 and 129 containing zeros (FIG. 6b) are moved in from the left. The shifted last word, composed of the bytes 106, 107,108 and 109 (FIG. 6c) is loaded in the storage unit 1 via the output 37 (FIG. 1) of the shift register 29 and via the data exchange bus 7. In a similar manner, the shifted next to last word, composed of the bytes 128,129,104 and 105 (FIG. 6b), can be loaded, if necessary, in the storage unit 1 via the output 36 (FIG. 1) and the data exchange bus 4.

Figure 6D:
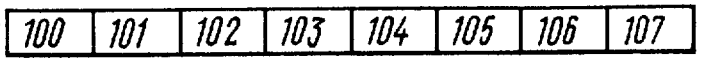
Figure 6E:
Figure 6F:

Now, the bytes 106,107 and 108 (FIG. 6c) of the last word of the second operand 91 (FIG. 5) to be processed occupy the identical positions, as compared to those of corresponding bytes 124,125 and 126 of the last word of the first operand 90. At the same time the word preceding the next to last word and composed of the bytes 100,101,102 and 103 is called and is placed together with the next to last word, previously fetched, (the bytes 104,105,106 and 107) on the data exchange buses 4 and 7 (FIG. 1), their relative position being shown in FIG. 6d. Both words are shifted by the shift register 29 (FIG. 1) so that the bytes 102,103,104 and 105 shown in FIG. 6e (bytes 130 and 131 in that figure are omitted) and belonging to the second operand 91 (FIG. 5) are set in the identical positions, as compared to those of the bytes 120,121 and 122, 123 of the next to last word of the first operand 90. The bytes 130 and 131 are moved in from the right and the shifted next to last word (the bytes 102,103,104 and 105 shown in FIG. 6f) is then placed in the storage unit 1 (FIG. 1).

The described actions are performed repeatedly until the entire field of the second operand 91 (FIG. 5) is fetched from main storage, aligned with respect to the first operand 90 and placed in the storage unit 1 (FIG. 1). If the second operand 91 (FIG. 5) cannot be placed in the storage unit 1 (FIG. 1) completely, then the alignment is accomplished by parts.

When the second operand 91 (FIG. 5) is aligned, the fetching of the first operand 90 from main storage is initiated in a word-by-word fashion. The last word of the first operand 90, composed of the bytes 124,125,126 and 127 (FIG. 5), is fetched from main storage and is passed via the device input 39 or 40 (FIG. 1) to the data exchange bus 4 or 7, for example, to the data exchange bus 4. Thereafter, a respective word of the second operand 91 (FIG. 5), composed of the bytes 106,107,108 and 109 (FIG. 6c) is transferred from the storage unit 1 to the data exchange bus 7.

The function according to which data is to be processed is determined by the control unit 17 (FIG. 1) which supplies a respective signal via the input 21 to the arithmetic/logic logic unit 20. The words composed of the bytes 124,125,126 and 127 (FIG. 5) and bytes 106,107,108 and 109 (FIG. 6e) and belonging, respectively, to the first and second operands 90 and 91 (FIG. 5) are delivered from the data exchange buses 4 and 7 (FIG. 1) via the switches 9 and 11 to the inputs 18 and 19 of the arithmetic/logic unit 20 which performs appropriate operations. The processing result is written into the storage unit 1 through the input 22.

It should be noted that data relevant to the first and second operands 90 and 91 (bytes 113,114,115,124,125 and 126 and bytes 95,96 and 97 (FIGS. 5,6c) and 108 (FIG. 5), respectively) is fetched from main storage together with data irrelevant to these operands (bytes 112 and 127 and bytes 94 (FIGS. 5,6c) and 109 (FIG. 5), respectively. To eliminate the irrelevant data, the data masking unit 16 produces a byte mask which is placed via the inputs 12 and 14 on data delivered from the data exchange buses 4 and 7 (FIG. 1) to the switches 9 and 11, respectively. The data masking unit 16 produces byte masks depending on the mask class and the byte code passed from the data exchange buses 4 and 7 to the inputs 23 and 24 of the data masking unit 16 according to a signal from the control unit 17.

Table 2 lists mask types and classes. There are four classes. A respective mask code on the data exchange bus 7 is used to specify a mask class. The mask type within the mask class is defined by a respective byte code on the data exchange bus 4.

Table 2

| Mask code | | | | | |
|---|---|---|---|---|---|
| Mask class on data exchange bus 7 | Byte code on data exchange bus 4 | Mask type (hexadecimal) | | | |
| 00 | 00 | FF | FF | FF | FF |
| 00 | 01 | 00 | FF | FF | FF |
| 00 | 10 | 00 | 00 | FF | FF |
| 00 | 11 | 00 | 00 | 00 | FF |
| 01 | 00 | 00 | 00 | 00 | FF |
| 01 | 01 | FF | FF | 00 | 00 |
| 01 | 10 | FF | FF | FF | 00 |
| 01 | 11 | FF | FF | FF | FF |
| 10 | 00 | 00 | 00 | 00 | 00 |
| 10 | 01 | FF | 00 | 00 | 00 |
| 10 | 10 | FF | FF | 00 | 00 |
| 10 | 11 | FF | FF | FF | 00 |
| 11 | 00 | FF | FF | FF | FF |
| 11 | 01 | FF | FF | FF | FF |
| 11 | 10 | FF | FF | FF | FF |
| 11 | 11 | FF | FF | FF | FF |

The class "00" mask is used to mask off data irrelevant to the given operand 90 or 91 (FIG. 5) and located to the left (as viewed in the plane of the drawing) of the field of the operand being processed. The mask type is defined by the code of the leftmost byte 95 or 113 of a respective operand 91 or 90.

The class "01" mask is used to mask off data irrelevant to the given operand 90 or 91 and located to the right (as viewed in the plane of the drawing) of the field of the operand being processed. The mask type is defined by the code of the rightmost byte 108 or 126 of a respective operand.

The class "10" mask is used when two operands 91 and 90 of different length are aligned relative to their right boundaries (as viewed in the plane of drawing). This mask allows for the selection of the left portion of one operand 90 or 91, which extends beyond the left boundary of the other operand 91 or 90. The selected portion of the operand 91 or 90 is then inspected for significance. The mask type is defined by the code of the leftmost byte 95 or 113 of the shorter operand 90,91.

The class "11" mask provides for the execution of an instruction according to the standard cycle. Byte masking involves other capabilities not shown in the above-described examples. This description is limited, however, to the application of the masks of classes "00" only.

When the address of the operand 90 or 91 is transferred to main storage via the data exchange bus 4 (FIG. 1), then the code of a respective byte 95 or 113 or 108 or 118 (FIG. 5) is passed to the data masking unit 16 (FIG. 1) via the input 23. At the same time, the code of the mask class is placed on the data exchange bus 7 and is passed in the data masking unit 16 via the input 24. According to a signal from the control unit 17, which is delivered to the data masking unit 16 via the control input 25, the byte mask is generated which is then passed to the inputs 12 and 14 of the switches 9 and 11, respectively. The mask is placed on data moved through the data exchange buses 4 and 7 according to respective signals available from the control unit 17. These signals applied to the inputs 13 and 15 of the switches 9 and 11, respectively, are generated at the moment the extreme words (bytes 94,95,96 and 97 (FIG. 6c) and 113,114,115 and 116 (FIG. 5) and bytes 106,107,108 and 109 and 124,125,126 and 127) of the operands 91 and 90, respectively are moved to the arithmetic/logic unit 20.

Thus, the data irrelevant to the operands 91 and 90, which is obtained from main storage, is not involved in data processing.

The shift parameter forming means 27 of the invention (FIG. 2) operates as follows.

When the operands 90 and 91 (FIG. 5) are fetched from main storage, their addresses available from the storage unit 1 (FIG. 1) appear on the data exchange buses 4 and 7. The addresses of the extreme bytes 95 and 113 and 108 and 126 (FIG. 5) of respective operands 91 and 90 are passed from the data exchange buses 4 and 7 (FIG. 1) via the inputs 45 and 46 (FIG. 2) to the shift code register 43. According to the byte codes and in the presence of a respective signal at the control input 47, available from the control unit 17 (FIG. 1), the shift code register 43 produces a four-bit shift code applied to the decoder 44 (FIG. 2). The signals from the output of the decoder 44 pass to the inputs 48,50 and 51 of the AND gates 49,52 and 53, respectively. The shift direction generating AND gate 49 operates to gather shift direction conditions and its output 54 produces right and left shift signals. The shift value generating AND gates 52 and 53 produce signals corresponding to the required shift values. In order to align the operands 91 and 90 (FIG. 5), they should be shifted zero, eight, sixteen or twenty four bit positions. If no signals are present at the outputs 55 and 56 of the AND gates 52 and 53, a shift of zero bit positions takes place. A signal at the output of one of these AND gates corresponds to a shift of eight bit positions, while a signal at the output of the other AND gate corresponds to a shift of sixteen bit positions; finally, signals at the outputs of both the AND gates indicate that a shift of twenty four bit positions takes place.

The shift direction and values are calculated according to data shown in Table 1, relative to the operand 90 or 91 (FIG. 5) whose address appears on the data exchange bus 4 (FIG. 1). In this case, the address of the operand being aligned 90 or 91 (FIG. 5) is placed on the data exchange bus 7 (FIG. 1). For example, the alignment relative to the first operand 90 (FIG. 5) requires that its address be placed on the data exchange bus 4 (FIG. 1) and the address of the second operand 91 (FIG. 5) be placed on the data exchange bus 7 (FIG. 1). In the case of right alignment, the addresses of the rightmost bytes 108 and 118 of respective operands 91 and 90 (FIG. 5) are applied to the data exchange buses 4 and 7, while the addresses of the leftmost bytes 95 and 113 are placed on these buses during left alignment.

The shift control means 28 of the invention (FIG. 3) operates as follows. A signal corresponding to the shift direction comes to the input 69 of the shift direction flip-flop 68 and is stored therein. Signals corresponding to the shift values come to the inputs 58 of the shift value flip-flop 57 and are stored therein. The number of shift value flip-flops 57 is equal to the number of shift values stored. Note that the number of shift values stored also includes those shifts whose values do not coincide with the magnitudes 0, 8, 16 and 24 (for example, shifts by one, two, four and other similar bit positions). This is due to the fact that the shift control means 28 can handle not only variable length data but also other types of data. The stored shift values are delivered from the shift value flip-flops 57 to the inputs 63 of the priority circuit 62 which handles then according to the priority scheme available. If the shift value of higher priority is available, then the shift values of lower priority are not handled. The shift value, which is being handled according to the priority scheme at the given point in time, is delivered from the priority circuit 62 to one of the inputs 65 of the decoder 64. After the current shift value has been handled, a respective output 71 of the decoder 64 produces a signal applied to the inputs 70 of the AND gates 60. According to a signal available from the control unit 17 (FIG. 1) and applied to the inputs 61 (FIG. 3) of the AND gates 60, a reset signal is produced and passed to the input 59 of that shift value flip-flop 57 which stores the shift value handled a moment before, with the result that the flip-flop is reset. This provides for the possibility of handling the shift value of the next priority. According to the shift values stored in the shift value flip-flops 57 and to the shift direction stored in the shift direction flip-flop 68 and applied to the input 67 of the decoder 64, the control unit 17 produces signals passed to the control input 66 of the decoder 64 whose outputs 72 generate a sequence of control signals delivered to the shift register 29 (FIG. 1).

The data masking unit 16 of the invention (FIG. 4) operates as follows. During transfer of the extreme words (bytes 92,93,94,95,108,109,110 and 111 (FIG. 5) and bytes 112,113,114,115, 124,125,126 and 127) of respective operands 91 and 90, the mask class is placed on the data exchange bus 7 (FIG. 1) and the address of the word being fetched is placed on the data exchange bus 4 (bytes 92,93,94,95,108,109,110 and 111 (FIG. 5) and bytes 112,113, 114,115,124,125,126 and 127). The mask code, through the input 23 (FIG. 1), and the code of the extreme byte 95,108,113 and 126 (FIG. 5), through the input 24 (FIG. 1) of the data masking unit 16, are applied, respectively, to the inputs 75 and 76 (FIG. 4) of the mask code register 73. According to a signal that comes to the control input 77 of the mask code register 73, the mask code is set in the mask code register 73 and is then passed to the decoder 74. The outputs of the decoder 74 produce signals that come to the inputs 78,79,80 and 81 of the AND gates 82,83,84 and 85, respectively. The outputs 86,87,88 and 89 of these AND gates produce the required type of mask, according to Table 2, which is placed on data transferred via the data exchange buses 4 and 7 (FIG. 1).

The present invention provides for more effective production processes for the computer processor incorporating the device of the invention and reduces its cost, since the processor features a more regular or systematic structure. This is attained due to the fact that the device of the invention is compatible with the processor structure oriented to full word data processing.

The invention also allows the units of the proposed device to be used for other types of data processing when full words are employed.

What is claimed is:

1. A device for processing multibyte data fields of variable length, comprising:
 a control unit, for controlling the cooperation of units of the device during the processing of multibyte data fields, having a multichannel output and first, second, third and fourth outputs;
 a storage unit, for storing operands, intermediate results and processing results, having an input, a control input, a first data input, a second data input, a first data output and a second data output, said control unit input of said storage unit being coupled to said first output of said control unit;

a first data exchange bus coupled to said first data input and to said first data output of said storage unit;

a second data exchange bus coupled to said second data input and to said second data output of said storage unit;

a data shift unit, for shifting the alignment of the data fields fed from the exchange buses in accordance with signals from said control unit, providing with a multichannel control input, first, second, third and fourth data inputs and first and second data outputs, said multichannel control input of said data shift unit being coupled to said multichannel output of said control unit, said first data input, said third data input and said first data output of said data shift unit being coupled to said first data exchange bus, and said second data input, said fourth data input and said second data output of said data shift unit being coupled to said second data exchange bus;

a first switch having first and second inputs, a multichannel input and an output, said first input of said first switch being coupled to said first data exchange bus;

a second switch having first and second inputs, a multichannel input and an output, said first input being coupled to said second data exchange bus, said second input of said first switch and said second input of said second switch being coupled to said second output of said control unit;

a data masking unit, for blanking out insignificant data within a data word, having a control input coupled to said third output of said control unit, a first input coupled to said first data exchange bus, a second input coupled to said second data exchange bus, and a multichannel output coupled to said multichannel inputs of said first and second switches; and an arithmetic/logic unit, for performing arithmetic and logical operations on said data, having a control input coupled to said fourth output of said control unit, a first input coupled to said output of said first switch, a second input coupled to said output of said second switch, and an output coupled to said input of said storage unit.

2. A data fields processing device as claimed in claim 1, wherein said data masking unit comprises:

a mask code register having a control input connected to said control input of said data masking unit, first and second inputs respectively connected to said first and second inputs of said data masking unit and setting the class and type of mask, and an output;

a decoder having an input coupled to said output of said mask code register, and a group of outputs; and a plurality of AND gates, the number of AND gates being equal to the number of bytes onto which a mask is placed, each AND gate having an input coupled to a respective output of said group of outputs of said decoder, and an output connected to said multichannel output of said data masking unit, said AND gates setting a mask for each combination of class and type of mask.

3. A data fields processing device as claimed in claim 1, wherein said data shift unit comprises:

a shift parameter forming means having a first data input receiving the byte code of the byte with respect to which the alignment will be made and a second data input receiving the byte code of the byte to be aligned respectively connected to said first and second data inputs of said data shift unit, a control input and a multichannel output indicating the amount and direction of the byte shift;

a shift control means, for forming control signals depending on the amount and direction of byte shift, having a multichannel output, a multichannel control input and a multichannel input coupled to said multichannel output of said shift parameter forming means, said control input of said shift parameter forming means and said multichannel control input of said shift control means being connected to said multichannel control input of said data shift unit; and a shift register having a multichannel input coupled to said multichannel output of said shift control means, a first data input and a second data input respectively connected to said third and fourth data inputs of said data shift unit, and a first output and a second output respectively connected to said first and second data outputs of said data shift unit.

4. A data fields processing device as claimed in claim 3, wherein the shift parameter forming means comprises:

a shift code register having a control input connected to said control input of said shift parameter forming means, first and second inputs respectively connected to said first and second data inputs of said shift parameter forming means, and an output;

a decoder having an input coupled to said output of said shift code register, and at least three groups of outputs;

a shift direction generating AND gate having a group of inputs coupled to the outputs of a respective group of said outputs of said decoder, and an output; and at least two shift value generating AND gates, each having a group of inputs coupled to the outputs of a respective group of outputs of said decoder, and an output, said output of said shift direction generating AND gate and said outputs of said shift value generating AND gates being connected to said multichannel output of said shift parameter forming means.

5. A data fields processing device as claimed in claim 4, wherein said shift control means comprises:

a shift direction flip-flop having an input coupled to said output of said shift direction generating AND gate, and an output;

a plurality of shift value flip-flops, the number of flip-flops being determined by that of shift values available, each said shift value flip-flop having a first input, a second input and an output, said first inputs of said shift value flip-flops being connected to said multichannel input of said shift control means;

a priority circuit having a number of inputs, each said input being coupled to said output of a respective shift value flip-flop, and a group of outputs;

a decoder having a control input, an input, a group of inputs, a first group of outputs, and a second group of outputs connected to said multichannel output of said shift control means, said input of said decoder of said shift control means being coupled to said output of said shift direction flip-flop, and the inputs of said group of inputs of said decoder being coupled to respective outputs of said group of outputs of said priority circuit; and a plurality of AND gates, the number of AND gates being equal to the number of said shift value flip-flops, each said AND gate having a first input, a second input and an output, said first input of each of said AND gates being coupled to a respective output of said group of outputs of said decoder, said output of each of said AND gates being coupled to said second input of a respective shift direction flip-flop, and said second inputs of each of said AND gates and said control input of said decoder being connected to said multichannel control input of said shift control means.

* * * * *